United States Patent Office 3,130,186
Patented Apr. 21, 1964

3,130,186
PROCESS FOR THE DISSOCIATION OF
POLYPROPYLENE
Erhard Siggel, Laudenbach (Main), Gerhard Meyer, Obernburg (Main), Wolfgang Rosener, Erlenbach (Main), and Werner Helmut, Obernburg (Main), Germany, assignors to Vereinigte Glanzstoff-Fabriken AG, Wuppertal-Elberfeld, Germany
No Drawing. Filed Aug. 4, 1961, Ser. No. 129,244
Claims priority, application Germany Aug. 9, 1960
4 Claims. (Cl. 260—93.7)

The present invention is directed to a process for treating polypropylene. More particularly, the invention is directed to a process for lowering the viscosity of polypropylene, which process causes said polypropylene to become suitable for use in manufacturing threads.

It is known to polymerize olefins under normal or low pressure conditions using particular catalyst systems. These catalyst systems are commonly referred to as Ziegler type catalysts and usually include an aluminum compound plus a compound of a metal in groups IV to XI of the periodic table. The aluminum compound may be an aluminum alkyl wherein the alkyl group has 2 to 4 carbon atoms, or it may be an aluminum compound of the formula $R_2AlX$ wherein R is alkyl or an aryl hydrocarbon radical and X is halogen, $-OR_1$, $-N(R_1)R_2$, $-N(R_1)COR_2$, $-S-R_1$, $-COCR_1$ or $-OSO_2R_1$ wherein $R_1$ and $R_2$ are lower alkyl, e.g., 2–8 carbons, phenyl, phenylalkyl, or cycloalkyl, e.g., cyclohexyl. Aluminum trialkyls, wherein the alkyl groups are lower alkyl groups of 2–4 carbons, are a class of preferred catalyst components.

The compounds of metals of groups IV, V, and VI of the periodic table of elements include simple halides, e.g., chlorides and bromides; oxyhalides, e.g., oxychlorides; complex halides, e.g., complex fluorides, and the like of titanium, zirconium, hafnium, thorium, uranium, vanadium, nobium, tantalum, chromium, molybdenum, or tungsten. Salts of titanium, zirconium, thorium, uranium, and chromium are preferred catalyst components. Titanium halides, espectially titanium tetrachloride and titanium trichloride, are especially desirable catalyst components.

Other catalyst systems which are comparable to the Ziegler type catalysts have been developed in recent years. These catalysts are also capable of polymerizing olefins at normal or low pressures.

The polymerization is carried out in a suitable inert organic solvent such as benzene fractions, benzol and its homologues, tetraline, dekaline, cyclohexane, toluene, and the like. The organic solvent acts as a dispersant for the catalyst.

Low pressure or normal pressure polymerization of the Ziegler type produces polyolefins having molecular weights of one million or more. Such polymers are unsuitable for use in manufacturing threads because they cannot be used in standard spinning equipment due to their high viscosities when in a molten condition.

In order to produce polyolefins and, in particular, polypropylenes, from which threads can be formed, such polymers have been dissociated thermically. The low molecular weight polymer fraction formed by this process acts as a softener and lowers the viscosity of the molten polymerizate. After threads have been spun from the polymerizate, the low molecular weight fractions are removed. This can be accomplished by washing the threads with ether or another solvent for the low molecular weight and atactic fractions. If an attempt is made to carry out the thermal dissociation within the spinning equipment, for instance in an extruder, it is found that the properties of the threads are not uniform because insufficient homogeneity of the spin material is obtained in the extruder. For this reason it is necessary to place a heated coil or other suitable equipment ahead of the spin extruder wherein the thermal dissociation is carried out and in which homogeneity is obtained. For this reason processes of this type are relatively cumbersome.

The thermal decomposition of polyolefins can also be accomplished by a process in which the polymer is homogenized and then filtered twice at temperatures above its melting point. This modified thermal decomposition process also does not lend itself particularly well to commercial operations.

In addition to thermal decomposition, other methods of lowering the viscosity of polymerizates have been tried in which oxygen or air are introduced into the melt. It is known that in polymerizing olefins with the above mentioned Ziegler type catalysts a certain quantity of oxygen is introduced into the system which partly inactivates the catalyst. It is claimed that by properly adjusting the amount of oxygen present in the polymerizate, a particular degree of polymerization can be obtained.

Actually, it has ben found that the effect of the oxygen is not restricted to the inactivation of the catalyst. Rather, oxygen also reacts with the olefins and causes a chain dissociation which forms keto and vinylidene terminal groups. Those portions of the polymer which are damaged by the oxygen remain undissolved in that part of the subsequent treatment of the polymer which is designed to remove the atactic components. The presence of the damaged portions of the polymer chain influences the quality of the polymerizate. For example, if the activity of the oxygen is particularly strong, thermic stability of the polymer in the spinning operation is reduced. Under certain circumstances decomposition and foaming of the molten mass may even take place.

It is an object of the present invention to provide an improved process for lowering the viscosity of molten polypropylene.

Another object of the invention is to provide a process for dissociating polypropylene which avoids the disadvantages inherent in prior art processes.

Other objects of the invention will become apparent to those skilled in the art from the following detailed description of the invention.

In general, the subject invention is based on the discovery that a polypropylene of high quality which is well suited for the spinning operation is obtained if the polypropylene produced by the usual normal or low pressure polymerization process is subjected to a particular dissociation reaction. In the process, polypropylene which has been purified by removing as much of the catalyst components as possible, is dispersed in an iso-alcohol containing from 3 to 8 carbon atoms, whereupon the dispersion is subjected to the action of oxygen or air at a temperature from about 100° C. to to about 10° below the melting point of the polymerizate. After this treatment, the alcohol and the atactic polypropylene or low molecular weight block polymers and dissociation products which are damaged by oxygen and which are dissolved in the alcohol are removed by suction after which the polymerizate is washed and the remaining alcohol is removed.

The subject process is best carried out immediately after the polymerization step. It is possible, however, to carry out the dissociation process at a later time. It is important, however, that the oxygen or air be introduced into the polymerizate after as much of the polymerization catalyst has been removed from the polypropylene as is possible.

Iso-alcohols are defined for purposes of this invention as aliphatic or cycloaliphatic alcohols having from 3 to 8 carbon atoms and containing at least one tertiary or quaternary carbon atom. Suitable iso-alcohols include monohydric alkanols and cycloalkanols such as isopropyl alcohol, isobutyl alcohol, isoamyl alcohol, 2-ethylhexanol (1), 4-methylpentanol(2), cyclohexanol, cycelopentanol, etc.

It is preferred in carrying out the process to select an iso-alcohol which boils at a temperature higher than the dispersing agents which are used in the polymerization reaction and which do not form an azeotrope with the dispersing agent. This is particularly true when the dissociation is to be carried out immediately after the polymerization reaction. By properly selecting the iso-alcohol with respect to the dispersing agent, the separation of the two by distillation becomes a simple matter.

During the dissociation reaction the iso-alcohol must be in its liquid phase. If the operation is carried out at temperatures above the boiling point of the alcohol, pressure must be applied to the system.

The action of the oxygen or the air can be arranged in such a manner that the oxygen or air is distributed through the polymerizate. This can be accomplished by blowing the oxygen or air through nozzles and into the dispersion. In closed reaction vessels which are maintained under increased pressure, a constant oxygen or air volume may be obtained above in dispersion and contact with the air or oxygen can be insured by intensive stirring or pumping of the dispersion.

The reaction is stopped when the desired degree of dissociation has been reached. This can be readily determined by taking samples and testing the viscosity of the solution. As soon as the desired value has been obtained the iso-alcohol is removed hot by suction, the product is washed with fresh, hot alcohol, and the remaining alcohol is removed by distillation with steam.

It is surprising that in the subject process the portions of the polymer which are damaged by oxygen, i.e., those containing carbonyl groups, are dissolved to such an extent and was removed with the alcohol that the dissociated polypropylene shows only a slight increase of the extinction carbonyl band in the ultra red spectrum over the product before the beginning of the oxygen dissociation. The portion of the dissolved separation products does not amount to more than 5% by weight of the total polymer.

The following examples are intended to illustrate but not limit the subject invention.

*Example I*

In a known manner, propylene was polymerized in toluene with aluminum triethyl and titanium trichloride as catalysts. The resulting polypropylene dispersion containing about 22% by weight of polypropylene was filtered under pressure which removes 60% to 70% of the dispersion agent. The moist polymerizate was then washed three times with warm isoamyl alcohol, the temperature being increased from 80° C. to 100° C. and finally 120° C. from one wash to the next. These washing steps removed the last traces of the dispersion agent. At the same time, portions of the catalyst and considerable quantities of amorphous polymer parts produced by the polymerization and consisting of atactic polypropylene or low molecular block polymers were separated from the reaction product. The remaining polypropylene had a solution viscosity of $\eta$ spec.=0.65 (determined as 0.1% solution in dekaline at 135° C. in an Ostwald biscosimeter). A dispersion of the polypropylene with fresh isoamyl alcohol was then made up at the rate of 10 parts by weight of alcohol for each part by weight of polypropylene. The dispersion was passed into another vessel into which air was blown through nozzles in such a manner that it passed through the dispersion. A temperature of 145° C. was maintained and the system was kept under pressure. After about six hours the desired degree of dissociation had taken place as was determined by taking samples and testing for solution viscosity. The solution viscosity was $\eta$ spec.=0.25. The supply of air to the vessel was stopped and the dispersion was again filtered hot through a pressure filter. The residue was washed with hot isoamyl alcohol and thereafter the remaining alcohol was removed by steam distillation. The polypropylene which was formed by this method and tempered one hour at 120° C. had a roentgenographically determined isoactive content of 82%. It could be made into threads without difficulty with ordinary melt spinning machines.

*Example II*

Propylene was polymerized in an isomeric hexane mixture (boiling point 64–69° C.) with aluminum triethyl and titanium trichloride as catalysts. The reaction temperature was 75° C. The resulting polypropylene dispersion containing about 25% by weight of polypropylene was filtered under pressure which removed about 70% of the dispersion agent. Thereupon the reaction vessel was heated and as the moist polypropylene was constantly stirred the dispersion agent was distilled off through a cooler. During this step a weak nitrogen stream was passed over the polymerizate. After about two hours, the entire dispersion agent had been distilled off. The dry polypropylene powder was then heated with dry methanol to 90° C. under pressure for about one hour. This operation was repeated after the alcohol had been removed by filtration. The methanol was then distilled off and the fully dry polypropylene powder was mixed with 9 parts by weight of 2-ethylhexanol-1 for each part by weight of polypropylene. The dispersion was then passed into a separate vessel whereupon a double volume of air was passed into the vessel under a pressure of four atmospheres above atmospheric pressure. The dispersion was heated to 135° C. and held at this temperature for 8 hours with constant and intensive stirring. The pressure of the system was then reduced to normal and the temperature was allowed to drop to 80° C. Thereupon the polymerizate was filtered and was washed with a small quantity of iso-alcohol. The remaining alcohol was then removed from the moist polypropylene by steam treatment. The polypropylene had a viscosity of $\eta$ spec.=0.18 as compared with a viscosity of $\eta$ spec.=0.67 before the treatment with air in accordance with the invention.

The amount of iso-alcohol employed in the process can vary within wide limits. In general, from about 2.3 to about 99 parts by weight of iso-alcohol for each part of polypropylene, and preferably from about 5.7 to about 19 parts by weight for each part of polypropylene, will provide satisfactory results.

As was pointed out above, the dissociation temperature should vary from about 100° C. to about 10° below the melting point of the polymer. The iso-alcohol that is chosen should have a boiling point which is higher than the boiling point of the dispersion agent used in the polyerization reaction. The iso-alcohol also should not form an azeotrope with the dispersion agent. Our preferred iso-alcohols are those having a boiling point between about 80 and about 180° C.

Obviously many modifications and variations of the invention as hereinbefore set forth may be made without departing from the spirit and scope thereof, and therefore only such limitations should be imposed as are indicated in the appended claims.

We claim:

1. A process for treating polypropylene which comprises dispersing said polypropylene in an iso-alcohol containing from 3 to 8 carbon atoms; passing oxygen into said dispersion while maintaining the temperature of said dispersion at from about 100° C. to about 10° C. below the melting point of the polymerizate; and thereafter removing said iso-alcohol from said polymerizate, said iso-alcohol having dissolved therein atactic polypropylene and low molecular weight block polymers.

2. A process for treating polypropylene which comprises purifying said polypropylene by removing therefrom the catalyst used in the polymerization reaction; dispersing said purified polypropylene in an iso-alcohol containing from 3 to 8 carbon atoms; passing oxygen into said dispersion while maintaining the temperature of said dispersion at from about 100° C. to about 10° C. below the melting point of the polymerizate; and thereafter removing said iso-alcohol from said polymerizate, said iso-alcohol having dissolved therein atactic polypropylene and low molecular weight block polymers.

3. A process as in claim 2 wherein said iso-alcohol has a boiling point between about 80° C. and about 180° C.

4. A process for treating polypropylene which comprises purifying said polypropylene by removing therefrom the catalyst used in the polymerization reaction; dispersing said purified polypropylene in an iso-alcohol containing from 3 to 8 carbon atoms, the amount of said alcohol being from about 2.3 to about 99 parts by weight based on the weight of said polypropylene; passing oxygen into said dispersion while maintaining the temperature of said dispersion at from about 100° C. to about 10° C. below the melting point of the polymerizate; and thereafter removing said iso-alcohol from said polymerizate, said iso-alcohol having dissolved therein atactic polypropylene and low molecular weight block polymers.

References Cited in the file of this patent

UNITED STATES PATENTS

| | | |
|---|---|---|
| 2,908,671 | Hochgraf et al. | Oct. 13, 1959 |
| 2,911,398 | Vandenberg | Nov. 3, 1959 |

UNITED STATES PATENT OFFICE
CERTIFICATE OF CORRECTION

Patent No. 3,130,186                        April 21, 1964

Erhard Siggel et al.

It is hereby certified that error appears in the above numbered patent requiring correction and that the said Letters Patent should read as corrected below.

In the grant, line 2, for "Wolfgang Rosener" read -- Wolfgang Rösener --; line 3, for "Werner Helmut" read -- Helmut Werner --; in the heading to the printed specification, line 5, for "Wolfgang Rosener" read -- Wolfgang Rösener --; line 6, for "Werner Helmut" read -- Helmut Werner --.

Signed and sealed this 27th day of October 1964.

(SEAL)
Attest:

ERNEST W. SWIDER
Attesting Officer

EDWARD J. BRENNER
Commissioner of Patents